(No Model.) 2 Sheets—Sheet 1.
W. H. PICKETT & J. L. NEILL.
BAKING PAN.
No. 472,811. Patented Apr. 12, 1892.
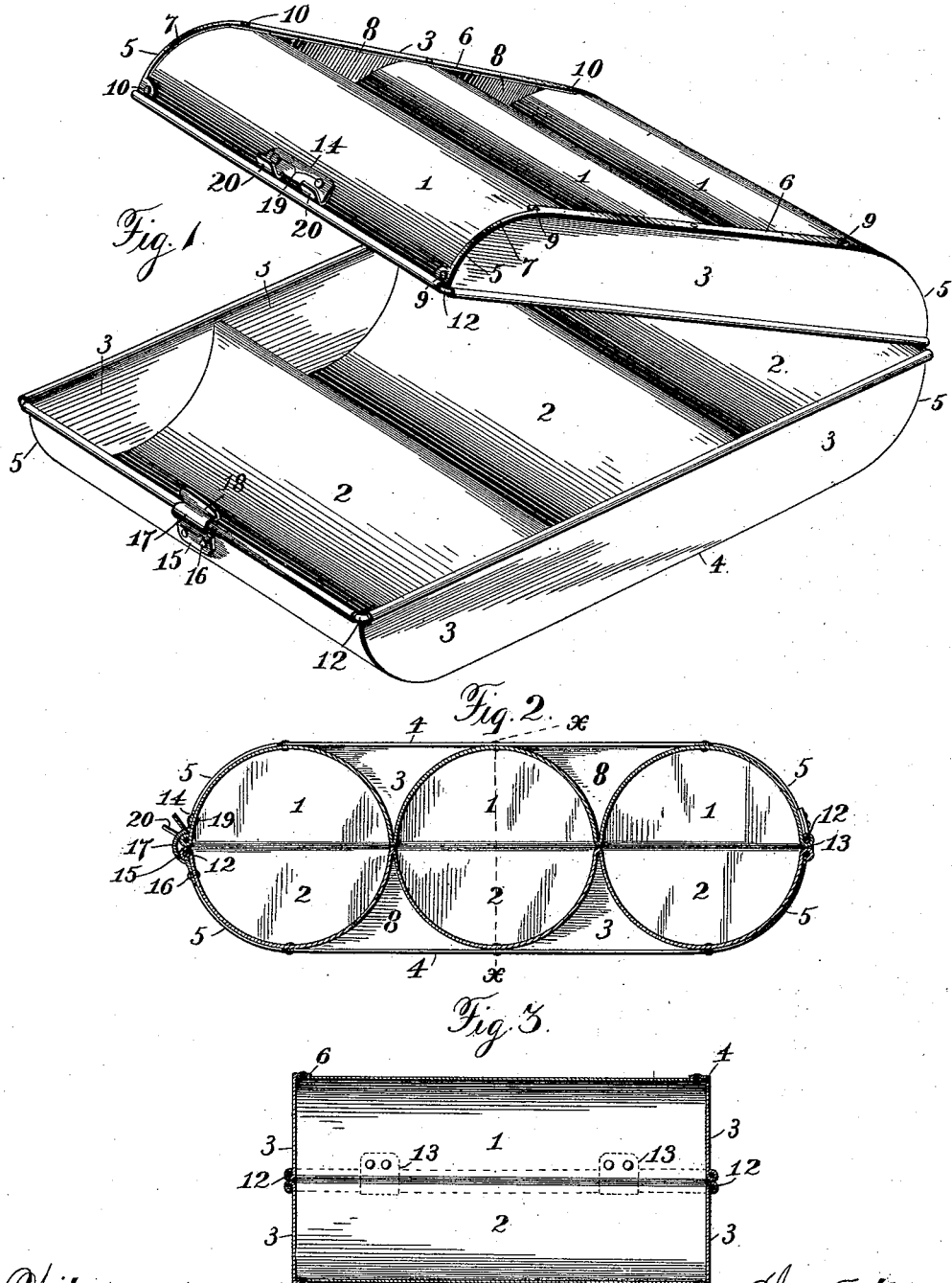

(No Model.) 2 Sheets—Sheet 2.
W. H. PICKETT & J. L. NEILL.
BAKING PAN.
No. 472,811. Patented Apr. 12, 1892.
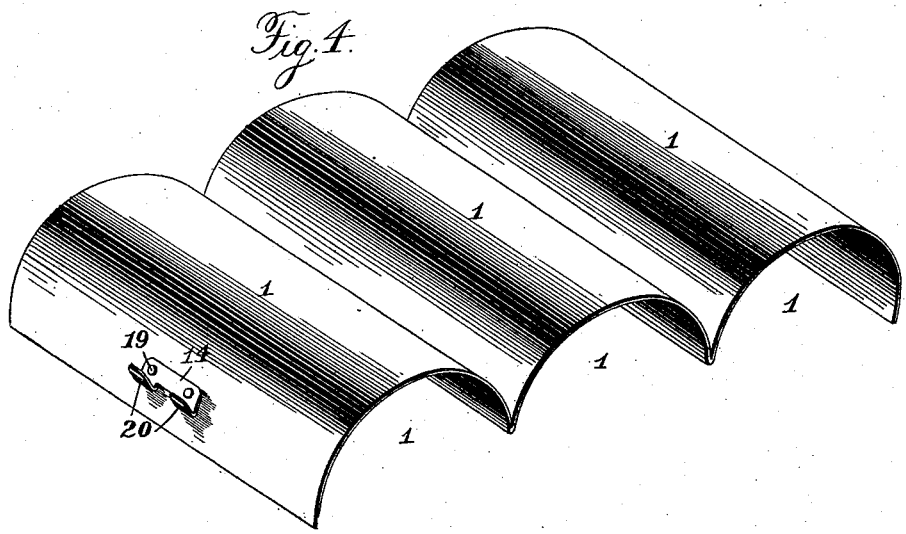
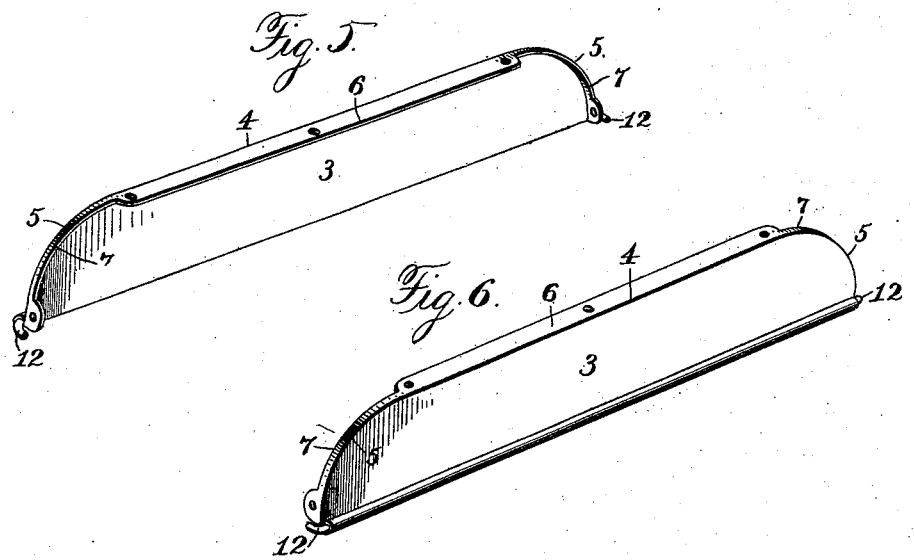
Witnesses:
Jas. E. Hutchinson.
Geo. W. Rea.
Inventors:
Wm. H. Pickett, and
Julia L. Neill,
By James L. Norris. Attorney
THE NORRIS PETERS CO., PHOTO-LITHO., WASHINGTON, D. C.

UNITED STATES PATENT OFFICE.

WILLIAM H. PICKETT AND JULIA L. NEILL, OF WARREN, PENNSYLVANIA.

BAKING-PAN.

SPECIFICATION forming part of Letters Patent No. 472,811, dated April 12, 1892.

Application filed July 15, 1891. Serial No. 399,589. (No model.)

*To all whom it may concern:*

Be it known that we, WILLIAM H. PICKETT and JULIA L. NEILL, citizens of the United States, residing at Warren, in the county of Warren and State of Pennsylvania, have invented new and useful Improvements in Baking-Pans, of which the following is a specification.

This invention relates to pans for baking cylindrical loaves of bread. That type of closed culinary vessels for baking bread which comprises cells or compartments substantially circular in cross-section are very desirable for producing cylindrical loaves with continuous crusts; but as heretofore constructed they are objectionable, in that the cells or compartments are formed of separate pieces of metal and each is provided with a longitudinal sliding cover, which renders it necessary to separately manipulate the cover of each cell or compartment for removing or examining the loaves inclosed within the pan, in consequence of which multilocular baking-pans, having means to close the compartments during the baking of cylindrical loaves, have never, so far as we are aware, come into general use. It has been proposed to construct a baking-pan of several separately-constructed pans, each having a flange which engages the adjacent or adjoining pan, the whole being surrounded and bound together by a wired edge; but such prior construction did not comprise two co-ordinate sections, adapted to rest one upon the other to provide a practically closed pan, which incloses and completely covers the dough during the baking process for the purpose of producing cylindrical loaves of bread.

The object of our invention is to improve the prior construction of multilocular baking-pans and provide a novel construction wherein a series of cylindrical cells or compartments are formed in two sections hinged together at one end in such manner that by lifting one section on its hinged attachment the entire series of loaves are exposed for examination or removal.

The invention also has for its object to provide this construction of multilocular baking-pan with novel means for securing together the hinged sections by a peculiar fastening, which prevents lateral or sidewise movements of one pan-section upon the other, and is also so constructed as to permit the hinged sections to be conveniently and quickly unfastened and swung apart when occasion requires.

The invention has also for its object to provide a novel construction of multilocular baking-pan wherein the several cells or compartments of each pan-section are composed of a single sheet of metal stamped or struck up to form chambers, which are semicircular in cross-section and which are closed at each end by flanged pieces of metal.

To accomplish these objects our invention involves the features of construction, the combination or arrangement of devices, and the principles of operation hereinafter described and claimed, reference being made to the accompanying drawings, in which—

Figure 1 is a perspective view of the baking-pan constructed in accordance with our invention, showing the pan partly open. Fig. 2 is a longitudinal central sectional view of the same, showing the pan closed. Fig. 3 is a transverse sectional view taken on the line *x x*, Fig. 2. Fig. 4 is a perspective view showing the cells or compartments of one pan-section stamped or struck up from a single piece of sheet metal. Figs. 5 and 6 are detail perspective views of the plates of metal to form the end walls of one pan-section.

In order to enable those skilled in the art to make and use our invention, we will now describe the same in detail, referring to the drawings, wherein—

The numerals 1 indicate the cells or compartments of the upper pan-section and 2 the cells or compartments of the lower pan-section, each of which sections is stamped or struck up from a single piece of sheet metal, with the cells or compartments formed semicircular, or approximately so, in cross-section. By thus constructing each pan-section from a single piece of sheet metal and striking and stamping it up with a series of semicircular cells or compartments we are enabled to economically manufacture multilocular baking-pans which are very efficient and desirable in use.

The ends of the cells or compartments of each pan-section are composed of sheet-metal plates 3, each formed with a longitudinal straight edge 4, quadrant-shaped ends 5, and laterally-projecting flange 6 at the edge of the plate which is opposite the straight edge 4, as represented in Figs. 5 and 6. The quadrant-shaped ends of this sheet-metal plate 3 are each provided with laterally-projecting flange 7 to overlie and conform to the walls of the end or outermost cells or compartments of each pan-section and the lateral flange 6 to overlie the walls of the cells or compartments and span the spaces 8 between such cells or compartments. The lateral flanges of the end plates 3 are riveted to the end walls of the cells or compartments, as at 9 and 10, and the straight-edges 4 of the end plates 3 and the outer edges of the end or outermost cells or compartments are wires, as at 12, to strengthen and impart the required rigidity to the structure. The pan-sections are co-ordinate in shape and size, and the two sections, constructed as described, are adapted to rest one upon the other, as in Fig. 2, in which position the wired edge of one pan-section bears closely against the wired edge of the other pan-section for the purpose of forming a joint which is practically closed as regards the conditions required for baking bread in the best possible manner, to retain all the moisture in the loaves and produce a thin crust. The wired edges of the pan-sections are at one end of the latter hinged together, as at 13, in any suitable manner to permit the sections to be opened and closed by swinging one upon the other on the hinged joint as a center. The ends of the pan-sections opposite the hinged connection are provided, respectively, with a bifurcated finger and guide-piece 14 and a spring catch-plate 15. The catch-plate is riveted, as at 16, to the wall of the end or outermost cell or compartment, and is arched outwardly, as at 17, and inwardly, as at 18, to form the locking rib or projection, which is adapted to engage the wired edge of the opposite pan-section, and thereby retain the pan-sections in their closed position.

The finger and guide piece 14 is composed of a plate of metal riveted, as at 19, to the upper pan-section and provided with two separate outwardly-projecting arms 20, formed at right angles, or approximately so, to the body or base-plate of the finger and guide piece 14 in such manner that when the pan-sections are brought together the catch-plate 15 is guided between the arms 20 and the pan-sections are fastened by the catch-plate, springing into engagement with the wired edge of the opposite pan-section, whereby such outwardly-projecting arms 20 effectually prevent the pan-sections from moving laterally one upon the other, thereby avoiding torsional strain on the pan-sections and their hinged connection. The arrangement of the arms 20 to extend at right angles, or approximately so, to the base-plate of the guide-piece 14 also serves as a finger-rest for the purpose of facilitating the unfastening of the catch-plate when occasion requires, for by placing the thumb on the catch-plate and the forefinger under one of the projecting arms 20 and then exerting a downward pressure on the thumb and an upward pressure on the fore-finger the pan-sections promptly unfasten, and the arm 20 then serves as a finger-piece for lifting the upper pan-section and swinging it on its hinged connection to an open position.

By the construction of each pan-section in the manner described, with a single plate 3 at each side, which is common to the ends of all the cells or compartments, such plate provides a closure at the ends of the spaces 8, and consequently such spaces at the portion of the pan which rests upon a support become practically dead-air chambers. The lateral flanges 6 of the end plates 3 by overlying the walls of the cells or compartments and spanning the spaces between the latter constitute horizontal supporting-rails, by which the pan is properly supported in the oven, while the walls of the cells or compartments are substantially braced and guarded against injury resulting from setting the pan in the oven or on other supports.

As before stated, the two pan-sections are exactly alike as regards construction, and they are co-ordinate with respect to shape, size, and capacity, the object of which is to produce independent cylindrical loaves of bread in a closed baking-pan comprising hinged sections adapted to be readily opened and closed, so that in baking the bread a uniformly-thin crust is obtained and the moisture is all confined in the loaves.

In baking bread with our improved pan it is advisable to place the dough in the pans in such quantity as to fill one pan-section and then permit the dough to rise in the pan, and after the dough becomes light the pan, in a closed condition, should be placed in the oven for the baking process. The pan should be turned over or reversed from time to time in order to brown the loaves alike on all sides.

The formation of the cells or compartments of each pan-section from a single piece of sheet metal avoids the presence of objectionable seams between the adjoining cells or compartments and materially reduces the cost of manufacture, while the end plates, with their flanges engaging the walls of the cells or compartments, not only close up the ends of such cells or compartments, but constitute rests for supporting the pan in the oven, and thereby avoid the presence of extraneous connecting-braces on which the pan rests when in use.

By our invention we provide a multilocular baking-pan which can be closed during the baking process and quickly opened at any time for examining the bread or removing the loaves from the pan. The construction is particularly designed to provide a neat, compact, efficient, and desirable article for the culinary department of a household for the purpose of producing cylindrical loaves of bread with very fine grain and which are pleasing to the eye.

Having thus described our invention, what we claim is—

1. A multilocular baking-pan consisting of upper and lower co-ordinate sections hinged together at one end and each composed of a series of cells or compartments semicircular, or approximately so, in cross-section and stamped or struck up from a single piece of sheet metal, and end plates having laterally-projecting flanges overlying and rigidly attached to the walls of the cells or compartments, substantially as described.

2. A multilocular baking-pan consisting of upper and lower sections hinged together and each stamped or struck up from a single piece of sheet metal with semicircular cells or compartments, and end plates for each pan-section, having straight edges and laterally-projecting flanges overlying and rigidly attached to the walls of the cells or compartments, substantially as described.

3. A baking-pan consisting of hinged upper and lower sections, each of which is composed of a series of transverse parallel cells or compartments semicircular in cross-section, and end plates flanged upon and riveted to the walls of the cells or compartments and having curved extremities following the curved shape of the outermost cells or compartments and provided with straight inner edges to come into parallel contact when the pan-sections are closed one upon the other, substantially as described.

4. A baking-pan consisting of upper and lower co-ordinate sections hinged together at one end, each stamped or struck up from a single piece of sheet metal with a series of transverse parallel cells or compartments, and end plates for each pan-section, having inner straight edges and outer flanged edges which overlie and are riveted to the walls of the cells or compartments, said straight edges of the plates containing strengthening-wires, which extend along the outermost cells or compartments and serve as the pivot connection between the pan-section, substantially as described.

5. A multilocular baking-pan consisting of two co-ordinate sections hinged together at one end and provided, respectively, at the opposite end with an attached spring catch-plate and a finger guide-piece, which is formed with two separated outwardly-projecting arms adapted to engage the catch-plate to prevent sidewise movement of the pan-sections upon each other and also serving as a finger-rest for disengaging the catch-plate and swinging the uppermost pan-section to its open position, substantially as described.

In testimony whereof we have affixed our signatures in presence of two witnesses.

WILLIAM H. PICKETT.
JULIA L. NEILL.

Witnesses:
SAML. T. NEILL,
JOSEPH A. SCHOFIELD.